June 9, 1953
S. M. CLIPPINGER
2,641,274
PRESSURE REGULATING AND SELECTING
SYSTEM FOR AIRCRAFT INSTRUMENTS
Filed Feb. 26, 1947
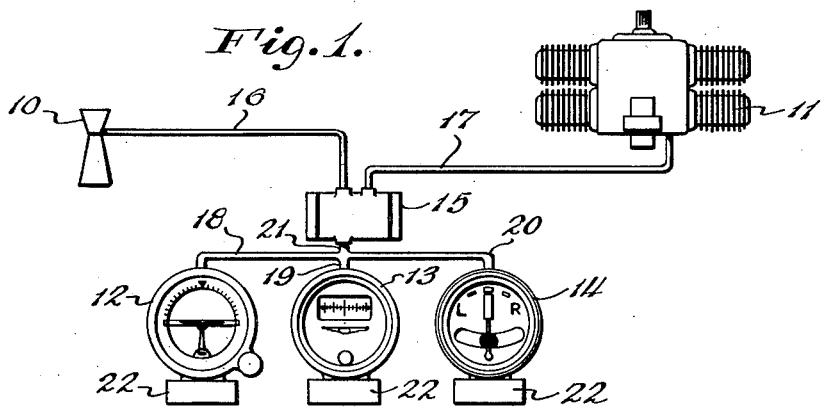
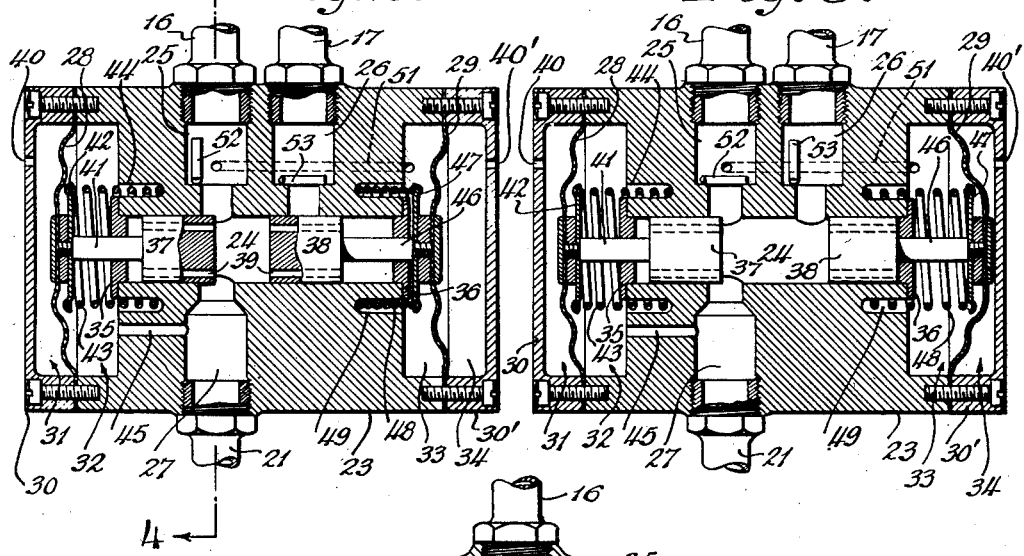
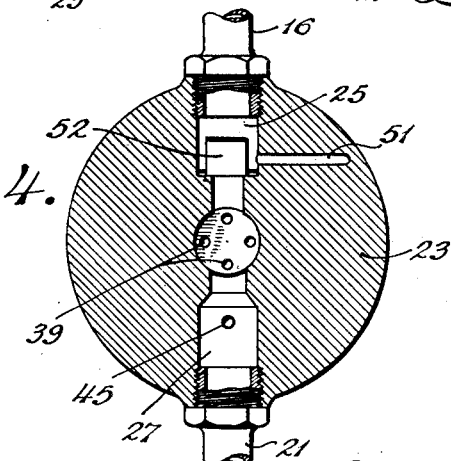
INVENTOR
STEWART M. CLIPPINGER
BY
Herbert P. Thompson
his ATTORNEY.

Patented June 9, 1953

2,641,274

UNITED STATES PATENT OFFICE 2,641,274

PRESSURE REGULATING AND SELECTING SYSTEM FOR AIRCRAFT INSTRUMENTS

Stewart M. Clippinger, East Orange, N. J., assignor to The Sperry Corporation, a corporation of Delaware Application February 26, 1947, Serial No. 731,134

4 Claims. (Cl. 137—119)

This invention relates to pressure regulating and selecting systems and has reference more particularly to a novel valve device for automatically selecting and maintaining constant the pressure to an instrument or instruments from one of a plurality of pressure sources.

At present, pneumatic aircraft instruments are operated from various sources of air pressure. These sources are generally of three forms: a Venturi tube, a bleed from the intake manifold of the aircraft's power plant, or a pneumatic pump connected to and driven by the power plant of the aircraft. Usually a vacuum or negative pressure system is employed although the valve of the present invention is applicable to positive pressures or pressures above that of atmosphere. The usual practice in supplying this pressure to an instrument has been first through a selector valve which is manually operated and selects the pressure from any one of the pressure sources. Between the selector valve and the instrument, there is generally placed a vacuum regulator. It is a function of this regulator to maintain the pressure in the instrument at a predetermined value.

The usually employed system has several disadvantages. In the event of icing conditions, a Venturi tube may become useless and the pilot must remember to throw the selector valve from "venturi" to "manifold," for example, as soon as these icing conditions are discernible. If he fails to do this, the instrument by which he is flying will slow down and, if such instrument is of the gyroscopic type, precession will occur, thereby giving an erroneous indication of the aircraft's attitude. Also, with the selector valve in the Venturi position and with a pilot changing from cruising speed to a glide as in approaching an airport, the resulting pressure drop at the venturi would cause a corresponding error in instrument indication and the pilot must again remember to throw the manual selector switch from "venturi" to "manifold."

Another disadvantage of the system, as usually employed, is that upon the failure of a pilot to move the manually operated selector valve to the "Venturi" position prior to the opening of the throttle for take-off, a very low or practically zero pressure in the manifold results in a like pressure at the instrument, causing an erroneous indication of the instrument.

By my present invention, I have overcome all of these disadvantages. My apparatus automatically selects that source of pressure which is high enough for the regulator to maintain the pressure at the instrument at a predetermined value. For example, if the pilot is flying under icing conditions and his venturi ices up and becomes useless, my device will automatically cut out the Venturi pressure source and open the intake manifold pressure source; or if the device is used in aircraft in which pressure pumps are used, if the motor which is supplying the instrument with pressure fails, my device will automatically shift the flow of pressure from the instrument to the vacuum pump on one of the other of the motors.

Therefore, it is the principal object of my invention to provide in a system for driving a plurality of pneumatically operated aircraft instruments from a plurality of pneumatic pressure sources means for connecting the conduit from said instruments to the conduits of said pressure sources whereby upon failure of the normally connected source of pressure to supply sufficient pressure to said instruments another of said sources will be automatically connected to said instrument conduit.

Another object of my invention is to provide in a system of the above character a novel, unitary device including pneumatically operated valve means for connecting said instrument conduit to one of said pressure source conduits when the pressure of the other of said source conduits falls below a predetermined value.

A further object of my invention is to provide in a system of the above character a novel unitary device including valve means for connecting said instrument conduit to one of said pressure source conduits when the pressure of the other of said sources falls below a predetermined value and means for effectively closing the conduit to this deficient source.

A still further object of my invention is to provide in a system of the above character means for maintaining the pressure at said instruments at a constant predetermined pressure value.

Throughout the specification, the term "pressure" is used. I use this term in a broad sense to include superatmospheric pressure or underatmospheric pressure known as "vacuum," the latter being the system most generally used in connection with aircraft instruments, and being the type specially described herein.

Other objects and advantages will become apparent from the specification taken in connection with the accompanying drawings, wherein, Fig. 1 is a diagram showing the system of the present invention employing a plurality of instruments, a Venturi tube providing one source of vacuum pressure and a manifold bleed providing the other source of vacuum pressure and their respective connecting conduits;

Fig. 2 is a longitudinal, sectional view of the device with the valves and associated elements in a position whereby the pressure at the Venturi tube is employed;

Fig. 3 is a view similar to Fig. 2 with the various elements of the device in a position for supplying pressure to the instruments from the manifold of the aircraft's engine when the pressure at the venturi falls below a predetermined value; and Fig. 4 is a sectional view taken on line 4—4 of Fig. 2.

Referring now to Fig. 1, there are shown two pressure-producing means which are, in the embodiment illustrated, productive of pressures below that of atmosphere, one of the means schematically represented as a Venturi tube 10 and the other the manifold of the aircraft's motor 11. A plurality of pneumatically operated aircraft instruments are shown as driven by these selective pressure sources, which instruments include an artificial horizon 12, a directional gyroscope 13 and a bank and turn indicator 14. However, it will be understood that the valve illustrated is equally adaptable to any apparatus which utilizes fluid pressure. Between the pressure sources 10 and 11 and the instruments 12, 13 and 14, there is shown my novel selecting and regulating device 15 and a plurality of conduits for connecting the various elements of the system. Conduit 16 connects the device 15 and venturi 10, conduit 17 connects the device 15 and the manifold of the engine 11, and conduits 18, 19 and 20 connect the instruments to the device 15 through a common conduit 21. Each instrument is provided with a filter member 22 so that all air flowing from the instruments to the vacuum sources 10 and 11 must pass through these filters, whereby no unfiltered air may pass to the manifold of the aircraft engine without first being cleaned of all foreign particles, such as dust and the like.

Fig. 2 shows in more detail the device 15 of the present invention. It consists mainly of a body portion or housing 23 with its various communicating bores having connections between the conduits 16, 17 and 21. The housing 23 has a central interior chamber 24 therein which is common to all three conduits 16, 17 and 21 through lateral connecting passages 25, 26 and 27. The housing 23 is also provided with two end cavities each having a diaphragm 28, 29 which divides each of said end cavities into two chambers 31, 32 and 33, 34.

Chambers 31 and 34 are formed by recessed end plates 30, 30' which serve to hold diaphragms 28 and 29 in position and are provided with openings 40, 40' which subject chambers 31 and 34 to the pressure of atmosphere. Chambers 32 and 33 are separated from central interior chamber 24 by end washers 35 and 36 and are subject to the pressures in conduits 21 and 16, respectively, to be described more fully as the description proceeds.

The central interior chamber 24 has movably mounted therein a pair of balance piston valves 37 and 38. Each valve has a number of longitudinal holes 39 drilled therethrough. These holes allow the pressure within chamber 24 to be distributed evenly on each face of the valve so that there will be no differential pressure in the chamber 24 which will impede the movement of the valves within the said chamber.

Piston valve 37 has a projecting rod or arm 41 which fits movably through a hole in end washer 35 and is fastened at its end portion to the diaphragm 28 so that movement of the diaphragm will cause a similar movement of the rod and valve. Also connected to the end of rod 41 is a rigid plate 42. Plate 42 serves as a seat for one end of a spring 43, the other end of which is seated in an annular groove 44 in housing 23. The movement of valve 37 and its associated parts is controlled by a passage 45 connecting the lateral passage 27 of instrument conduit 21 to the chamber 32. Its function will be explained fully in the description of the operation.

The piston valve 38 has a similar construction to that of valve 37. Arm 46, which is integral with valve 38, fits movably through end washer 36 and has its end portion fastened to the diaphragm 29 and is movable therewith. The end portion of rod 46 also has fastened thereto a rigid plate 47 which serves as a seat for one end of spring 48. The other end of the spring 48 is seated in an annular groove 49 in the casing 23. The movement of valve 38 and its associated parts is controlled by a passage 51 which connects lateral passage 26 of pressure source conduit 16. Its function will also be explained fully in the following description of the operation.

Located in the lateral passage 25 is a check valve 52 which seats itself upon a flat surface provided by the lessened diameter of lateral passage 26 near the central interior chamber 24. The check valve 52 serves to open or close the conduit 16 to the interior chamber 24. A similar check valve 53 is provided in lateral passage 26 in a similar manner as check valve 52. As mentioned above, at take-off the pressure at the intake manifold drops to zero and a vacuum is created at the venturi, but this vacuum pressure is insufficient to overcome the pressure of spring 48 and both piston valves are momentarily open. Check valve 53 serves to prevent the gas mixture in the intake manifold from passing to the venturi through interior chamber 24 thereby avoiding a dangerous fire hazard. It is desirable to pivotally mount these check valves loosely on a pin so that they are slightly movable and each can find its own best seating position.

The operation of the device of my invention will now be described. In normal flight in clear weather, the position of the valves and their associated elements are in the position shown in Fig. 2 with the Venturi tube as the principal or normal source of pressure. The venturi 10 draws air under pressure from the atmosphere through filters 22 of the instruments 12, 13 and 14 driving their respective rotors and indicating mechanism. This air under pressure flows through conduits 18, 19 and 20 and into common instrument conduit 21 and thence into lateral passage 27. From passage 27 it flows into the central interior chamber 24 where the negative pressure is distributed throughout the chamber by means of holes 39 in the valves 37 and 38, thereby allowing the valves to float, that is, to have no differential pressures on their faces.

The Venturi pressure then draws the air into lateral passage 25 and maintains the check valve in an open position and the air is also drawn from lateral passage 25 into source conduit 16 and thence to venturi 10. The venturi also draws air from the end chamber 33, thus creating a differential air pressure on each side of diaphragm 29, the chamber 34 being subject to atmospheric air pressure through openings 40. The pressure in chamber 33, being less than that in chamber 34, causes the diaphragm 29 to move to the left compressing spring 48 and causing valve 38 also to move to the left and to maintain the lateral passage 26 at source conduit 17 in a closed position.

Let us assume that the aircraft, which has been flying in clear weather, as described above, and the pneumatic flight instruments have been operated by a pressure created by the Venturi tube, now strikes bad weather; the visibility drops to zero and ice begins to form on the craft. The pilot must now fly by instruments alone, but the icing conditions have disabled the Venturi tube; therefore, the pressure must now be derived from another source, for example, the craft's engine manifold.

This change is accomplished automatically by my device as follows: The venturi, which has been creating the vacuum pressure for the instruments, now is useless and air at atmospheric pressure appears in source conduit 16 and in lateral passage 25. The air, in trying to flow back into the instruments 12, 13 and 14 through central interior chamber 24 to bring the system to an equal pressure condition, closes check valve 52 which arrests this backward flow. However, the atmospheric pressure does appear in passage 51 and therefore in end chamber 33. Since there is now air under atmospheric pressure on each side of diaphragm 29, the only pressure on the diaphragm will be that created by the spring 48 which forces diaphragm 29 through spring seat 47 to the right. The piston valve 38, being fixedly attached to diaphragm 46, also moves to the right thereby opening the lateral passage 26. The opening of passage 26 permits the pressure created in the engine manifold to drive the instruments 12, 13 and 14 through instrument conduit 21, central interior chamber 24 and source conduit 17.

If the aircraft now flies into clear weather again and the ice disappears from the venturi, the vacuum pressure created thereby appears in source conduit 16, lateral passage 25 and thus in end chamber 33 through passage 51, creating a differential pressure on diaphragm 29 and causing piston valve 38 to move to the left closing source conduit 17. Check valve 52 will open and permit air to flow from instruments 12, 13 and 14 through instrument conduit 21 into interior chamber 24 and thence to source conduit 17 to venturi 10.

It will be understood that this selection will take place at any time when the pressure created by the Venturi source is not sufficient to drive the instruments at full speed, as described above.

Another feature of my invention is to provide an automatic regulator in the same small compact housing 23 which contains the pressure source selector. In describing this feature let us assume the following conditions: the venturi creates a vacuum pressure of six inches of mercury, the engine manifold a pressure of say ten inches of mercury, and that the instruments are designed to operate at a pressure of four inches of mercury. It is therefore necessary to maintain a constant pressure at the instrument from a variable pressure at the sources.

Neglecting the small pressure drop in the conduits between the instrument and lateral passage 27, there is to be maintained therein a vacuum pressure of four inches of mercury. The instrument pressure appears in end chamber 32 through passage 45 and creates a differential pressure on the diaphragm 28, which pressure is just balanced by the force of the spring 43 thereby maintaining the piston valve 37 in a balanced condition.

Valve 37 controls the flow of air between lateral passage 27 and interior chamber 24. If the pressure in chamber 24 is at Venturi pressure of six inches of mercury, valve 37 partially closes lateral passage 27 causing a drop in pressure therein to four inches. If the pressure in passage 27 drops below four inches of mercury, this drop will appear in end chamber 32 resulting in a change in the differential pressure on diaphragm 28. The spring 43, responding to this change, forces diaphragm 28 to the left which causes a corresponding movement of valve 37 to the left, opening lateral passage 27 to the greater pressure in interior chamber 24. As this greater pressure then appears in end chamber 32, the valve 37 will respond, through action of diaphragm 28, to restore the valve 37 to its original position allowing a pressure of four inches of mercury to be maintained in passage 27 and instruments 12, 13 and 14.

If the automatic selector changes from the Venturi pressure source to the manifold pressure source, a greater pressure will appear in interior chamber 24 and in lateral passage 27. This greater pressure will also appear in end chamber 32 and cause the diaphragm to move to the right carrying with it the piston valve 37 which closes further the passage 27 thereby reducing the pressure therein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pressure selecting and regulating system, a device adapted to be connected between at least two sources of fluid pressure and a pressure utilizing apparatus, said device comprising, a unitary body portion having a longitudinal internal chamber, first and second ports communicating with said chamber and adapted to be respectively connected to said sources, a third port communicating with said chamber and adapted to be connected with said apparatus, valve means responsive to the pressure at said first port for closing said first port when the pressure therein drops below a predetermined value, diaphragm means having a first side and a second side, said diaphragm means being responsive to pressure differentials between said first and second sides, said first side being subjected to atmospheric pressure and said second side being subjected to the pressure at said first port, and a balanced piston valve operatively connected directly to said diaphragm means, said piston valve being slidably disposed within said chamber and movable in cooperable relation to said second port, whereby said diaphragm means directly moves said piston valve automatically to open said second port when the pressure at said first port is above a predetermined value and to close said second port when the pressure at said first port is below said predetermined value.

2. In a unitary valve structure for controlling the flow of a fluid operating medium to a pressure-responsive apparatus from at least two sources of fluid pressure, a valve body portion having a first port adapted to be connected to the first of said sources of pressure, a second port adapted to be connected to the second of said sources of pressure, a service port communicable with said first and second ports and adapted to be connected with said apparatus, a check valve element adapted to open and close said first port, means including pressure responsive means differentially responsive to the pressure of atmosphere and the pressure at said first port, and a piston valve element operatively connected directly to said pressure responsive means, said piston valve element being slidably disposed in said valve body portion and adapted to open and close said second port, whereby said pressure responsive means directly positions said piston valve element normally to maintain said second port closed and to open said second port only when the pressure of said first source exceeds a predetermined value.

3. In an automatic pressure selecting and regulating system, a device adapted to be connected between first and second sources of fluid pressure and a pressure utilizing apparatus, said device comprising a unitary body portion having a longitudinal internal chamber, first and second ports communicating with said chamber and adapted to be respectively connected with said pressure sources, a third port communicating with said internal chamber and adapted to be connected with said apparatus, a first balanced piston valve, a second balanced piston valve, said first valve being in cooperable relation to said first port, said second valve being in cooperable relation to said second port, both of said valves being slidably disposed in said longitudinal internal chamber and movable independently of each other, a third normally open valve element responsive to the pressure at said first port for cutting out the first source of pressure when the pressure thereat drops below a predetermined value, first diaphragm means adapted to operate said first piston valve, one side thereof being subjected to atmospheric pressure and the other side being connected to the pressure at said third port, said first valve being actuable to partially close said third port when the degree of pressure thereat is above a predetermined value, and to effect a further opening of said port when the pressure thereat decreases below a predetermined value, second diaphragm means adapted to operate said second piston valve, one side thereof being subjected to atmospheric pressure and the other side being connected to the pressure at said first port, said second valve being actuable to close said second port when said third valve element is open and to effect an opening of said second port when said third valve element is closed.

4. The device recited in claim 3 wherein the first diaphragm means is connected directly to the first piston valve and the second diaphragm means is connected directly to the second piston valve.

STEWART M. CLIPPINGER.

References Cited in the file of this patent

UNITED STATES PATENTS

| Number | Name | Date |
|---|---|---|
| 459,545 | Freeman | Sept. 15, 1891 |
| 2,059,104 | Harrah | Oct. 27, 1936 |
| 2,138,989 | Thomas | Dec. 6, 1938 |
| 2,318,261 | St. Clair | May 4, 1943 |
| 2,509,504 | Jensen | May 30, 1950 |